United States Patent [19]

Berneking

[11] 4,325,527
[45] Apr. 20, 1982

[54] VEHICLE SEATS

[75] Inventor: Hans-Jürgen Berneking, Porta Westfalica, Fed. Rep. of Germany

[73] Assignee: P. A. Rentrop, Hubbert & Wagner Fahrzeugausstattungen GmbH & Co. KG, Stadthagen, Fed. Rep. of Germany

[21] Appl. No.: 98,892

[22] Filed: Nov. 29, 1979

[30] Foreign Application Priority Data

Nov. 29, 1978 [DE] Fed. Rep. of Germany ....... 2851562

[51] Int. Cl.³ .......................................... A45D 19/04
[52] U.S. Cl. .................................. 248/394; 248/396
[58] Field of Search ............... 248/396, 394, 395, 421, 248/419, 608, 398

[56] References Cited

U.S. PATENT DOCUMENTS

| 3,460,793 | 8/1969 | Posh | 248/394 |
| 3,669,398 | 6/1972 | Robinson | 248/394 X |
| 3,669,398 | 6/1972 | Robinson | 248/608 X |
| 3,692,271 | 9/1972 | Homier | 248/394 |
| 3,740,014 | 6/1973 | Swenson et al. | 248/608 |
| 4,190,225 | 2/1980 | Bauer et al. | 248/394 |
| 4,222,543 | 9/1980 | Gedig et al. | 248/394 |

Primary Examiner—J. Franklin Foss
Attorney, Agent, or Firm—Penrose Lucas Albright

[57] ABSTRACT

A vehicle seat has a subframe carrying an adjustment device which adjusts a seat portion by lifting it and moving it simultaneously forward. The adjustment device includes two linkages at the front and rear of the subframe respectively for supporting the front and rear of the seat portion. Each linkage carries a segment. A pawl is engageable with the segment to lock the linkage against movement thereby also locking the seat portion against movement. A spring biases the rear linkage with respect to the subframe to raise the seat portion upwardly. The segment of the front linkage forms a separate pivotal link in the linkage.

9 Claims, 13 Drawing Figures

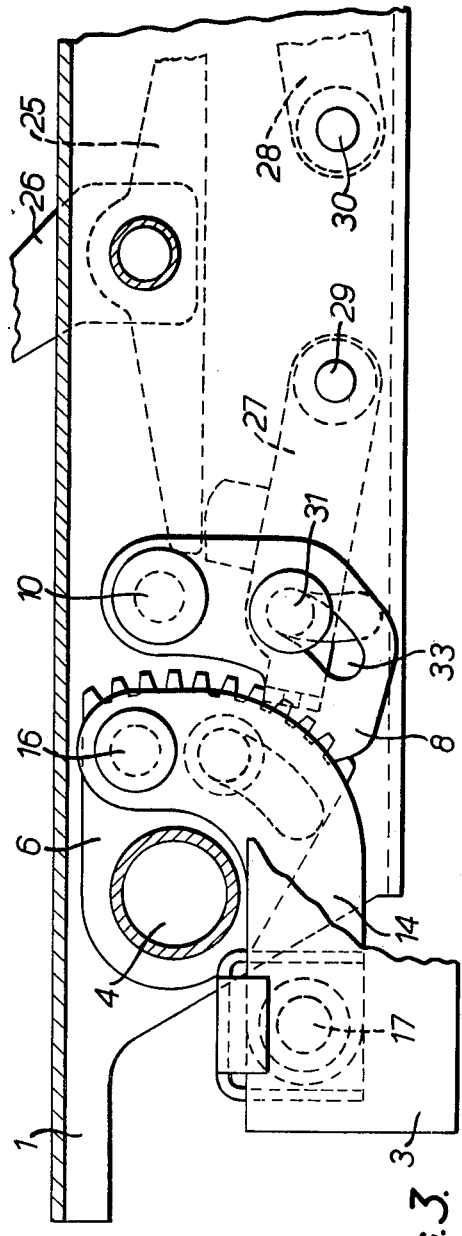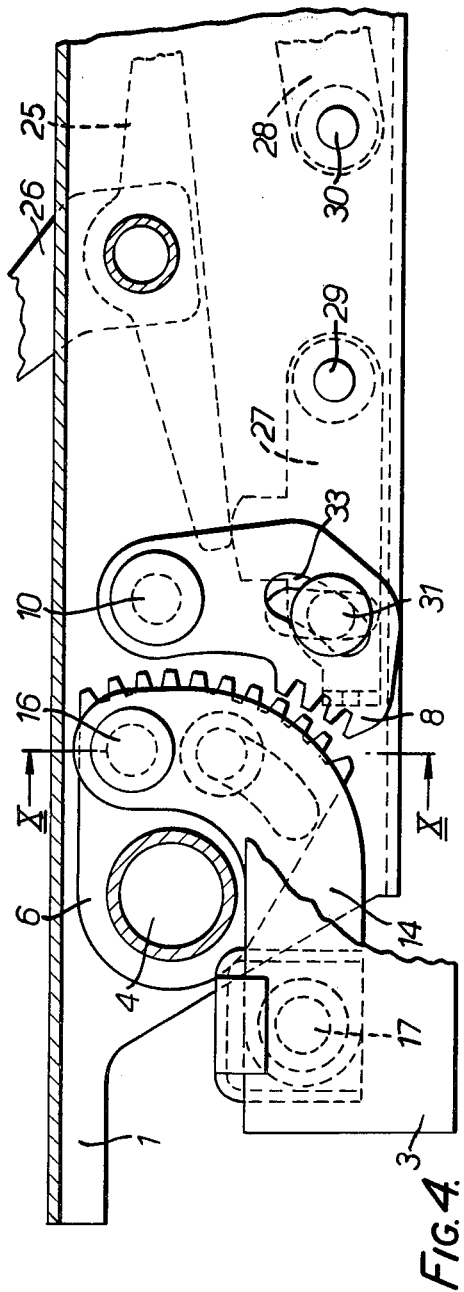

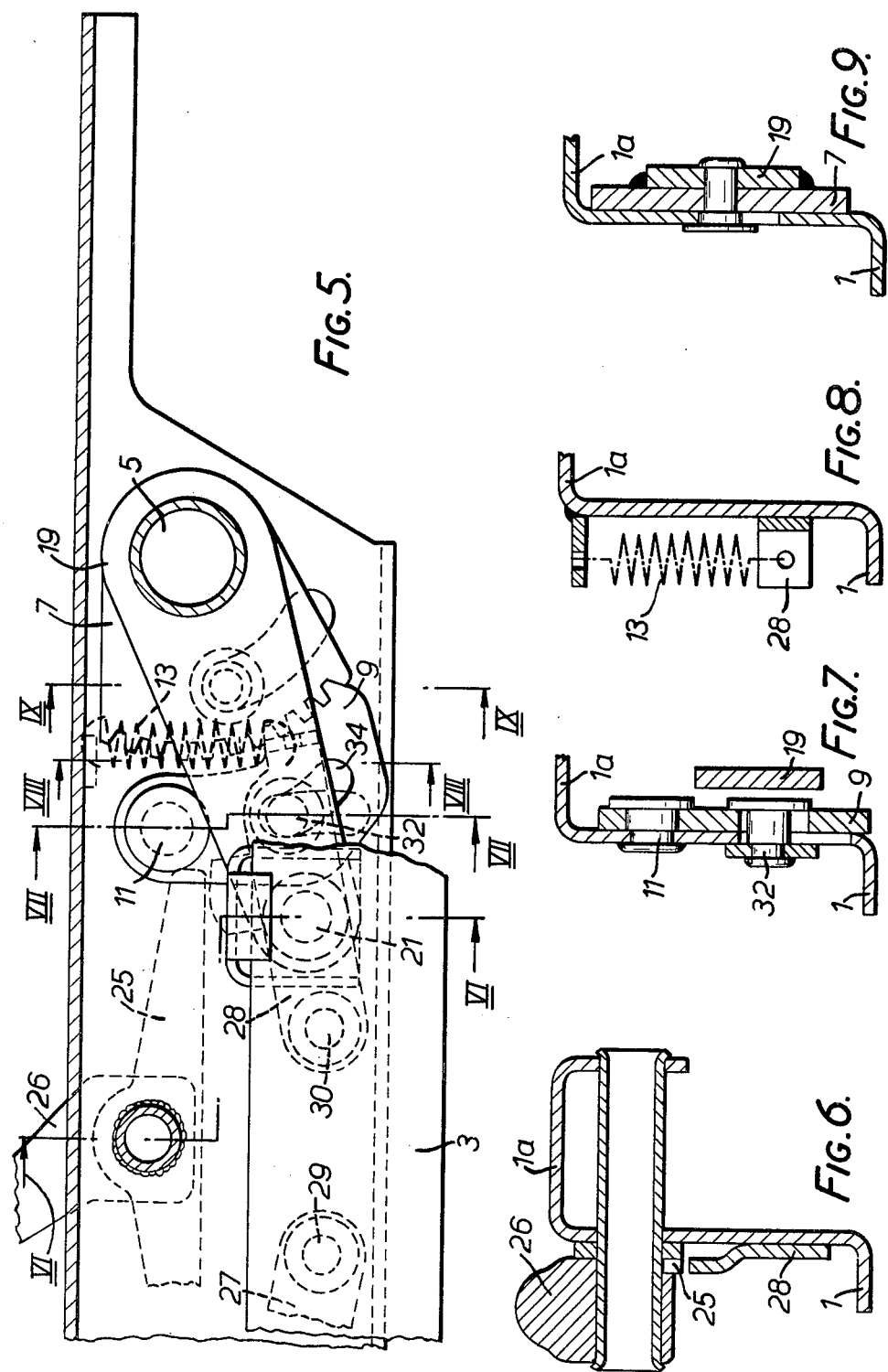

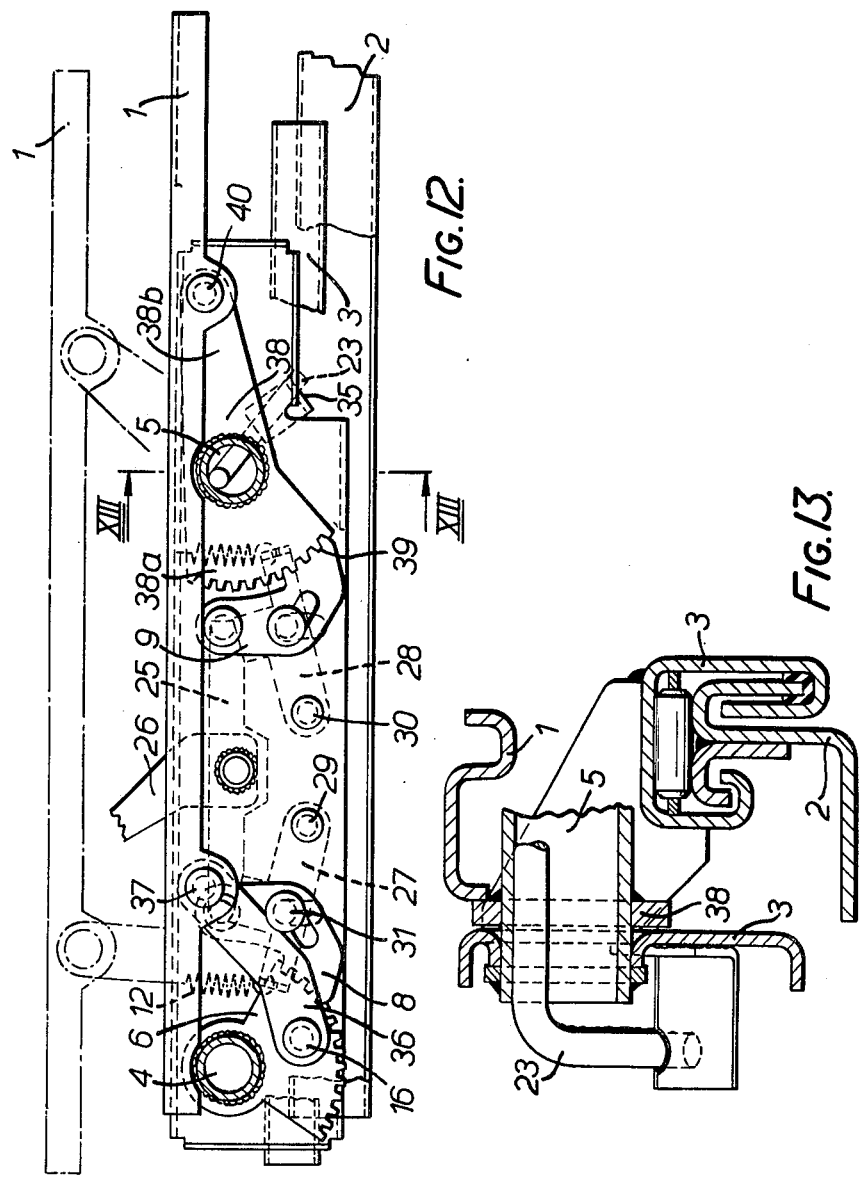

VEHICLE SEATS

BACKGROUND OF THE INVENTION

1. Field of the Invention

The present invention relates to seats for use in vehicles for example.

SUMMARY OF THE INVENTION

According to the invention there is provided in a vehicle seat a seat support for carrying a seat portion, an elongate subframe for mounting on the vehicle floor, a device lifting the seat support relative to the subframe in discrete steps and simultaneously moving the seat support longitudinally of the subframe, the lifting device comprising, a pair of pivotal levers located one at each longitudinal end of the subframe, spring means mounted at one longitudinal end of the subframe, the spring means being so arranged as to be tensioned upon movement of the seat support from the raised to the lowered position, a pair of toothed segments located one at each longitudinal end of the subframe and at least one of which is pivotally connected to a corresponding one of the pivotal levers to form a pivotable linkage, with opposite ends of the linkgage being pivotally connected respectively to the seat support and subframe, whereby relative movement between the members of the or each pivotable linkage causes the lifting of the seat support and simultaneously its movement longitudinally of the subframe, a pair of toothed pawls each located adjacent a corresponding one of the segments and biased into engagement with a corresponding segment whereby when engaged with the segment it locks the two members of the linkage against relative movement, and release means operable to disengage the toothed pawls from their corresponding segments and so allow the spring means to effect the simultaneous lifting and longitudinal movement of the seat support relative to the subframe.

According to the invention there is further provided in a vehicle seat, a device for the stepwise lifting and simultaneous moving forward of the seat support of the seat portion relative to a subframe, a pair of pivoting levers at the front or rear sitting area of the seat support for effecting movement of the seat support, a torsion spring at the rear sitting area, the spring being tensioned on the movement of the seat support into the lowered position, a toothed segment located in the front and rear sitting area, a pivotably mounted toothed pawl engaging each toothed segment, a pivotably mounted shift lever movable to release the two toothed pawls and thereby the tension in the torsion spring whereby to tilt the pair of pivoting levers situated in the rear sitting area, and so that, as a result of the movement of the seat support, upwardly and forward, the pair of pivoting levers situated in the front sitting area are also tilted alongside with it.

BRIEF DESCRIPTION OF THE DRAWINGS

Vehicle seats embodying the invention will now be described, by way of example, with reference to the accompanying diagrammatic drawings, in which:

FIGS. 3 and 4 are fragmentary view to an enlarged scale of the left-hand portion of the seat of FIG. 1 in different operating states;

FIG. 5 is a fragmentary view to an enlarged scale of the right-hand portion of the seat of FIG. 1;

FIG. 6 is a section taken on line VI—VI of FIG. 5;

FIG. 7 is a section taken on line VII—VII of FIG. 5;

FIG. 8 is a section taken on line VIII—VIII of FIG. 5;

FIG. 9 is a section taken on line IX—IX of FIG. 5;

FIG. 12 is a fragmentary side elevation of another vehicle seat with the seat portion and back rest removed; and FIG. 13 is a section taken on XIII—XIII of FIG. 12.

Figure 1:
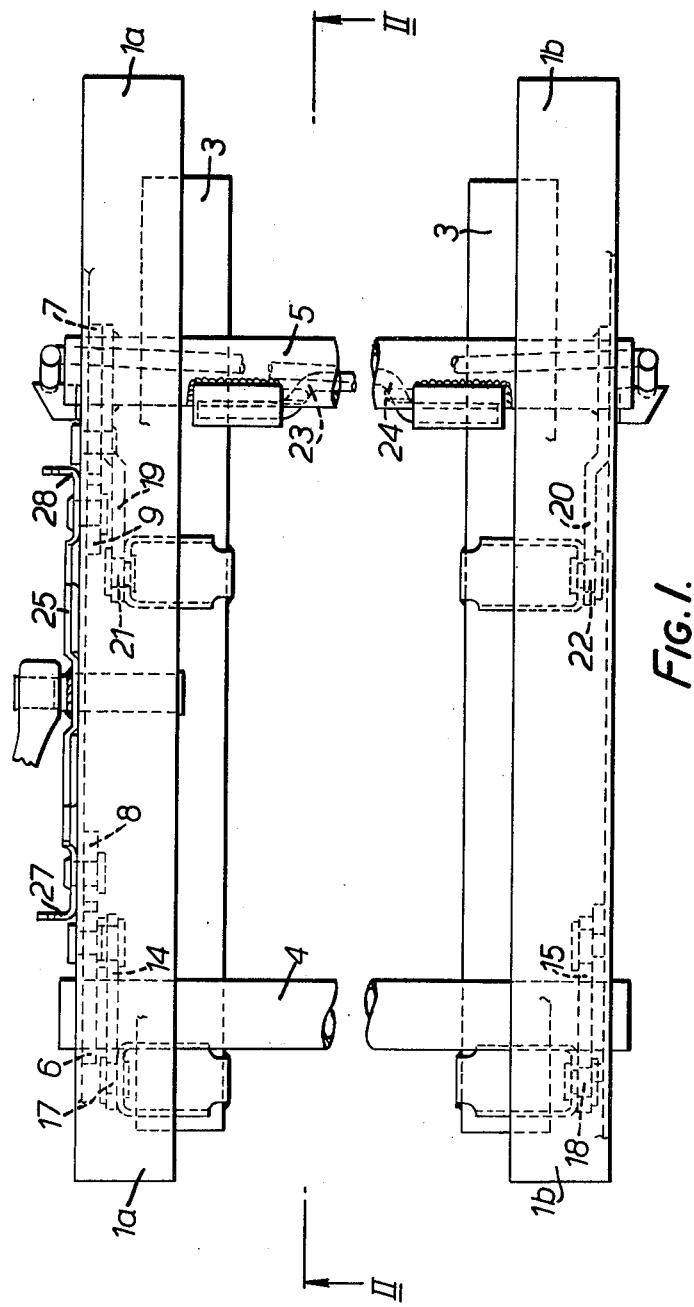
FIG. 1 is a plan view of the vehicle seat with the seat portion and the back rest removed.

The vehicle seat shown in FIG. 1 includes a subframe mounted on the floor of a vehicle (not shown) and carrying a seat portion and back rest (also not shown). The subframe allows the adjustment of the attitude of the seat portion relative to the floor. The subframe includes a lower pair of rails 2 rigid with the vehicle floor (not shown) and an upper pair of rails 3 slidable along the lower pair of rails. Two support sections 1a and 1b supported by the upper rails 3 act as a support for the seat portion.

The two support sections 1a and 1b are linked by two transversely extending tubular members 4 and 5.

At one end of each tube 4, 5 a toothed segment 6, 7 is mounted with which each of the two toothed pawls 8, 9 co-operates, these pawls being pivotably mounted about a pin 10, 11. These pins 10, 11 are mounted in the seat support 1 (FIG. 7).

The toothed pawls 8, 9 are subject to the action of tension springs 12, 13 which tend to move the two toothed pawls 8, 9 into the engagement position in which they engage into the associated toothed segments 6, 7.

Reference FIGS. 14, 15 denote a pair of pivoting levers disposed in the front sitting area, the pivoting levers 14, 15 being constructed as angle levers. At one of its ends the pivoting lever 14 is articulated over the pin 16 about the toothed segment 6, while the other end of this pivoting lever 14 is articulated on the upper rail 3 of the sub-frame. The pivoting point is here denoted by reference FIG. 17. The pivoting lever 15 is hingeably connected over the hinging point 18 with the other upper rail 3 of the pair of upper rails.

In the rear sitting area provision is also made for a pair of pivoting levers 19, 20, the pivoting levers of which 19 and 20 are actually constructed along a straight line. One end of this pair of pivoting levers 19, 20 is fixed to the tube 5, while the opposite other end is connected via the articulations 21, 22 with the associated upper rail 3 of the sub-frame.

Reference FIGS. 23, 24 each denote a torsion spring which is connected at one end with the tube 5 and at the other end with the seat support 1.

In one section 1a of the seat support 1 a two-arm pivoting lever 25 is pivotably mounted, the lever being actuatable by means of an actuation rod 26. The two arms of the pivoting lever 25 are here denoted by 25a and 25b.

Each arm 25a or 25b of the shift lever 25 cooperates in this arrangement with a control lever 27, 28 which is constructed as an one-arm lever and is pivotably mounted by means of the pins 29, 30 in the section 1a of the seat support 1. On the end opposite the pins 29, 30 there is mounted in each case a pin 31, 32, these pins engaging in corresponding recesses 33, 34 in the two toothed pawls 8, 9.

Figure 2:
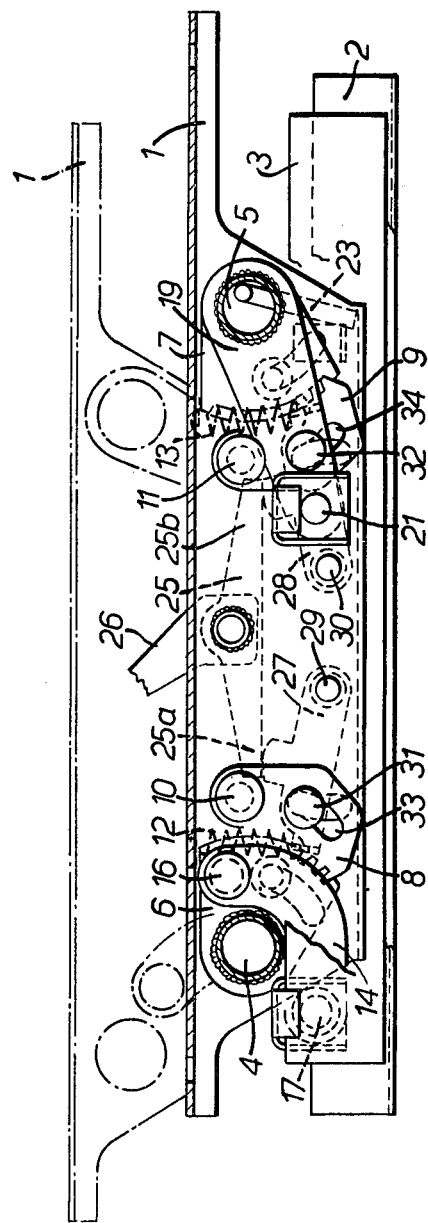
FIG. 2 is a vertical section taken on line II—II of Figure.
Figure 10:
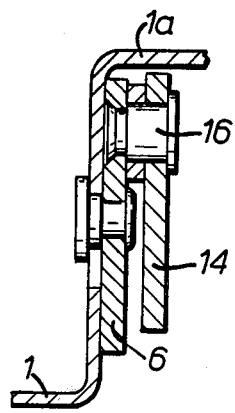
FIG. 10 is a section taken on line X—X of FIG. 4.

As FIGS. 1 and 2 clearly show, contrary to the method of embodiment according to FIG. 12, the two tubes 4, 5, the toothed pawls 8, 9 and the shift lever 25 are mounted in the seat support 1.

The embodiment according to FIG. 12 differs from those of FIGS. 1 and 2 in the first place in that the two tubes 4, 5, the toothed pawls 8, 9 and the shift lever 25 are disposed in the two upper rails 3 of the sub-frame. In addition, one end of the two torsion springs 23, 24 is firmly connected at point 35 with the two upper rails 3 of the sub-frame.

Furthermore, in the form of embodiment represented in FIG. 12 of the drawing, one end of the two pivoting levers is articulated on the seat support 1, the pivoting point being denoted by reference FIG. 37.

Finally, one lever 38 of the pair of pivoting levers in the rear sitting area is constructed as a two-arm lever with the two arms 38a and 38b. One lever arm 38a in this arrangement supports the toothed segment 39 cooperating with the toothed segment 9, while the other lever 38b of the two pivoting levers is connected with the seat support via the articulation 40.

The manner of operation of the seat according to the invention will be described hereinunder on the basis of FIGS. 1 to 5 and 11:

In the position in which the seat support 1 of the sitting-on portion is situated at its lowermost point, the individual parts assume the position represented in FIGS. 1 to 5.

Figure 11:
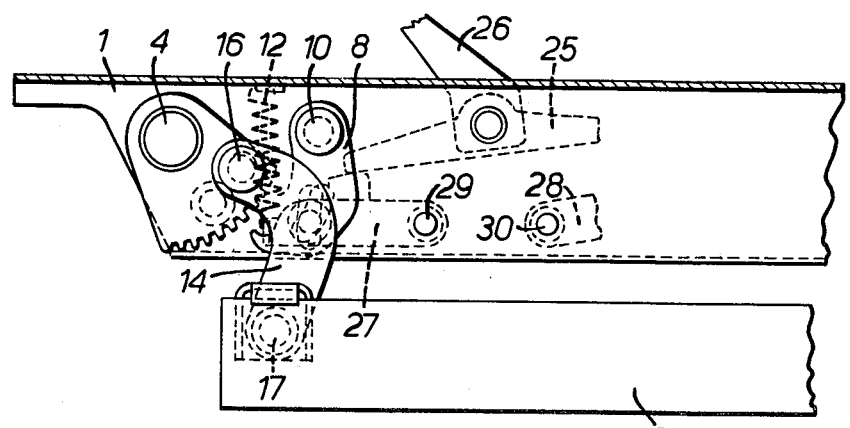
FIG. 11 is a fragmentary side elevation of the seat of FIG. 2 with the seat support in its uppermost operational position.

If now the seat is to be used by a person whose length of body is relatively small, the sitting-on portion 1 must be not only raised, but also simultaneously moved forward, that is to say in the direction of the driving wheel of the motor vehicle, so that also such a person may have a good overall view of the section of road in front of him or her. To bring the sitting portion 1 and thereby the seat into the raised position it will be sufficient to tilt the actuation lever 26 of the shift lever 25 in FIG. 2 of the drawing slightly clockwise. The consequence of this is that the control lever 28 also tilts clockwise, so that the toothed pawl 9 also tilts clockwise over the pin 32 introduced into the recess 34. As a result, the teeth of the toothed pawl 9 come out of engagement as regards those of the toothed segment 7. As a result, the force stored in the two torsion springs 23, 24 is released, and these springs tilt anti-clockwise the two pivoting levers 19, 20 pivotably mounted in the joints 21, 22, in such a manner that the seat support 1 is correspondingly raised in the rear area. At the same time the shift lever 25 is tilted anti-clockwise over the actuating rod 26 (FIG. 2), as a result of which the control lever 27 is tilted along the same direction, so that the toothed pawl 8 is moved anticlockwise into the release position (FIG. 4) over the pin 31 and the recess 33. As a result the associated toothed segment 6 is released, in such a manner that as a result of the movement of the seat support 1 the two pivoting levers 14, 15 are able to tilt freely anticlockwise with the result that also the seat support 1 in the forward area can participate in the movement thereof in the rear sitting area (FIG. 11).

If the shift lever 25 releases the two control levers 27, 28, the tension springs 12, 13 move the toothed pawls 8, 9 back into the locking position, so that a modification of the sitting portion 1 position is no longer possible.

On loading the sitting portion 1 when the toothed pawls 9 are out of engagement the two torsion springs 23, 24 are again tensioned.

While in the embodiment according to FIGS. 1 to 11 the essential parts of the actuation mechanism, that is to say the tubes 4, 5, the toothed pawls 8, 9 and the shift lever 25 are lifted with the seat support 1, this is not the case with the embodiment according to FIG. 12.

I claim:
1. In a vehicle seat,
a seat support for carrying a seat portion,
an elongate subframe for mounting on the vehicle floor,
a device lifting the seat support relative to the subframe in discrete steps and simultaneously moving the seat support longitudinally of the subframe, the lifting device comprising,
a pair of pivotal levers located one at each longitudinal end of the subframe,
spring means mounted at one longitudinal end of the subframe, the spring means being so arranged as to be tensioned upon movement of the seat support from the raised to the lowered position,
a pair of toothed segments located one at each longitudinal end of the subframe and at least one of which is pivotally connected to a corresponding one of the pivotal levers to form a pivotable linkage, with opposite ends of the linkage being pivotally connected respectively to the seat support and subframe, whereby relative movement between the members of the pivotable linkage causes the lifting of the seat support and simultaneously its movement longitudinally of the subframe,
a pair of toothed pawls each located adjacent a corresponding one of the segments and biased into engagement with a corresponding segment whereby when engaged with the segment it locks the two members of the linkage against relative movement, and
release means operable to disengage the toothed pawls from their corresponding segments and so allow the spring means to effect the simultaneous lifting and longitudinal movement of the seat support relative to the subframe, the release means comprising
a pivotal two-arm lever, and
a pair of pivotal control levers associated with each said pawl, one of each set of associated pawl and lever defining a slot and the other of each set carrying a pin slidably engaging the slot whereby when the pivotal two arm lever is pivoted in one sense, one arm thereof displaces one of the control levers to effect disengagement of the associated pawl with its corresponding segment and when the two arm lever is pivoted in the opposite sense the other arm thereof displaces the other control lever to effect disengagement of its associated pawl from its corresponding segment.

2. A seat according to claim 1, including a spring for biasing each pawl into engagement with its corresponding segment.

3. A seat according to claim 1 wherein the seat support has a pair of tubular members located at opposite longitudinal ends of the subframe but extending transversally of the sub-frame, wherein each segment is mounted on a corresponding tubular member and wherein the spring means extends between one said tubular member and the sub-frame.

4. A seat according to claim 3, wherein the two tubular members, the two toothed pawls and the pivotal two-arm lever are all carried by the seat support.

5. A seat according to claim 3, wherein the two tubular members, the two toothed pawls and the two-arm lever are all carried by the sub-frame.

6. In a vehicle seat, a seat support for carrying a seat portion, an elongate subframe for mounting on the vehicle floor, a device lifting the seat support relative to the subframe in discrete steps and simultaneously moving the seat support longitudinally of the subframe, the lifting device comprising, a pair of pivotal levers located one at each longitudinal end of the subframe, one said pivotal lever being curved spring means mounted at one longitudinal end of the subframe, the spring means being so arranged as to be tensioned upon movement of the seat support from the raised to the lowered position, a pair of toothed segments located one at each longitudinal end of the subframe and at least one of which has a curvature corresponding to the curvature of, and is pivotally connected to, said one pivotal lever to form a pivotable linkage, with opposite ends of the linkage being pivotally connected respectively to the seat support and sub-frame, whereby relative movement between the members of the pivotable linkage causes the lifting of the seat support and simultaneously its movement longitudinally of the subframe, a pair of toothed pawls each located adjacent a corresponding one of the segments and biased into engagement with a corresponding segment whereby when engaged with the segment it locks the two members of the linkage against relative movement, and release means operable to disengage the toothed pawls from their corresponding segments and so allow the spring means to effect the simultaneous lifting and longitudinal movement of the seat support relative to the subframe.

7. A seat according to claim 1 including a pair of rails rigid with the vehicle floor, and wherein the sub-frame is slidable along the pair of rails.

8. A seat according to claim 1 wherein one of said segments and its corresponding pivotal lever are rigid with each other.

9. A seat according to claim 8, wherein the segment and the pivotal lever which are rigid with each other lie on opposite sides of a common pivotal axis.

* * * * *